United States Patent
Ugai

(10) Patent No.: US 11,399,112 B2
(45) Date of Patent: Jul. 26, 2022

(54) INFORMATION PROCESSING APPARATUS, NON-TRANSITORY COMPUTER READABLE MEDIUM STORING INFORMATION PROCESSING PROGRAM, AND INFORMATION PROCESSING SYSTEM

(71) Applicant: FUJIFILM Business Innovation Corp., Tokyo (JP)

(72) Inventor: Yoshikazu Ugai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 280 days.

(21) Appl. No.: 16/355,829

(22) Filed: Mar. 17, 2019

(65) Prior Publication Data

US 2019/0327383 A1    Oct. 24, 2019

(30) Foreign Application Priority Data

Apr. 23, 2018    (JP) .............................. JP2018-082419

(51) Int. Cl.
*H04N 1/32* (2006.01)
*G06F 3/12* (2006.01)
*G06K 15/02* (2006.01)

(52) U.S. Cl.
CPC ..... *H04N 1/32539* (2013.01); *H04N 1/32545* (2013.01)

(58) Field of Classification Search
None
See application file for complete search history.

(56) References Cited

U.S. PATENT DOCUMENTS

| | | | |
|---|---|---|---|
| 9,112,779 B2 | 8/2015 | Yamada et al. | |
| 2004/0215759 A1* | 10/2004 | Takahashi | G06F 3/1229 709/223 |
| 2008/0288988 A1* | 11/2008 | Yabe | H04N 21/4828 725/91 |
| 2009/0241176 A1* | 9/2009 | Beletski | G06F 9/505 726/7 |
| 2010/0115587 A1* | 5/2010 | Kubota | H04L 63/08 726/3 |
| 2010/0128598 A1* | 5/2010 | Gandhewar | H04L 67/1002 370/217 |

(Continued)

FOREIGN PATENT DOCUMENTS

| | | | | |
|---|---|---|---|---|
| JP | H11110163 | * | 4/1999 | .............. G06F 3/12 |
| JP | 2012220961 | | 11/2012 | |

(Continued)

OTHER PUBLICATIONS

Office Action of Japan Counterpart Application, with English translation thereof, dated Nov. 30, 2021, pp. 1-9.

*Primary Examiner* — Beniyam Menberu
(74) *Attorney, Agent, or Firm* — JCIPRNET

(57) ABSTRACT

An information processing apparatus includes an acquisition section that acquires information from a communication device, and a switching section that switches an apparatus to process the information acquired from the communication device, between the information processing apparatus and another information processing apparatus, in accordance with a state of the information processing apparatus and a state of the communication device.

5 Claims, 11 Drawing Sheets

(56) References Cited

U.S. PATENT DOCUMENTS

| | | | | |
|---|---|---|---|---|
| 2012/0162679 A1* | 6/2012 | Okajima | ............ | H04N 1/32529 |
| | | | | 358/1.13 |
| 2012/0207023 A1* | 8/2012 | Tsuda | .................... | H04W 48/06 |
| | | | | 370/235 |
| 2016/0124686 A1* | 5/2016 | Maeda | .................. | G06F 3/1292 |
| | | | | 358/1.14 |

FOREIGN PATENT DOCUMENTS

| JP | 2017128041 | 7/2017 |
|---|---|---|
| JP | 2018058315 | 4/2018 |

\* cited by examiner

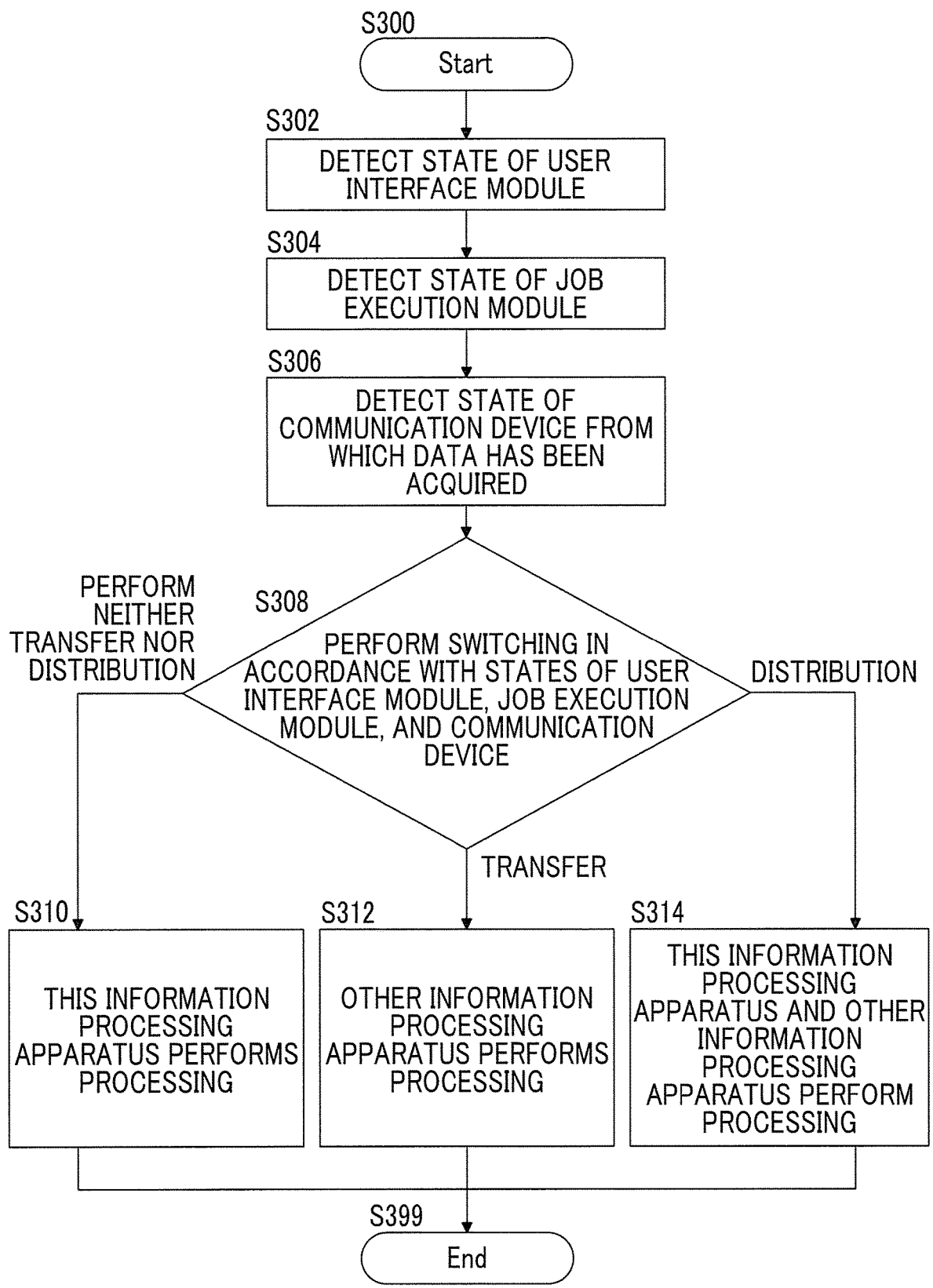

FIG. 5

| No | STATE OF IMAGE PROCESSING APPARATUS | STATE OF IoT DEVICE | TRANSFER (BYPASS) OR DISTRIBUTION |
|---|---|---|---|
| 1 | NOT OPERATED BY USER AND NOT PERFORM JOB | NUMBER OF IoT DEVICES: SMALL | THIS INFORMATION PROCESSING APPARATUS PERFORMS PROCESSING WITHOUT TRANSFER (BYPASS) AND DISTRIBUTION |
| 2 | NOT OPERATED BY USER AND NOT PERFORM JOB | NUMBER OF IoT DEVICES: MEDIUM TO LARGE | DISTRIBUTED PROCESSING |
| 3 | BEING OPERATED BY A USER OR PERFORMS JOB | NUMBER OF IoT DEVICES: SMALL | TRANSFER (BYPASS) PROCESSING |
| 4 | BEING OPERATED BY A USER OR PERFORMS JOB | NUMBER OF IoT DEVICES: MEDIUM TO LARGE | TRANSFER (BYPASS) PROCESSING |
| 5 | PERFORMING POWER SAVING | NUMBER OF IoT DEVICES: SMALL | THIS INFORMATION PROCESSING APPARATUS PERFORMS PROCESSING WITHOUT TRANSFER (BYPASS) AND DISTRIBUTION |
| 6 | PERFORMING POWER SAVING | NUMBER OF IoT DEVICES: MEDIUM TO LARGE | DISTRIBUTED PROCESSING |

FIG. 8

| No | STATE OF IMAGE PROCESSING APPARATUS | TRANSFER (BYPASS) OR DISTRIBUTION |
|---|---|---|
| 101 | BEING OPERATED BY USER | TRANSFER (BYPASS) PROCESSING |
| 102 | IN PROCESS OF PERFORMING JOB | DISTRIBUTED PROCESSING |
| 103 | NOT OPERATED BY USER AND NOT PERFORM JOB | THIS INFORMATION PROCESSING APPARATUS PERFORMS PROCESSING WITHOUT TRANSFER (BYPASS) AND DISTRIBUTION |
| 104 | PERFORMING POWER SAVING | THIS INFORMATION PROCESSING APPARATUS PERFORMS PROCESSING WITHOUT TRANSFER (BYPASS) AND DISTRIBUTION |

FIG. 9

| No | STATE OF IoT DEVICE | TRANSFER (BYPASS) OR DISTRIBUTION |
|---|---|---|
| 201 | CAMERAS OF WHICH NUMBER IS EQUAL TO OR GREATER THAN A ARE PROVIDED AS IoT DEVICE | TRANSFER (BYPASS) PROCESSING |
| 202 | CAMERAS OF WHICH NUMBER IS EQUAL TO OR GREATER THAN 1 AND SMALLER THAN A ARE PROVIDED AS IoT DEVICE | DISTRIBUTED PROCESSING |
| 203 | CAMERA IS NOT PROVIDED AS IoT DEVICE | THIS INFORMATION PROCESSING APPARATUS PERFORMS PROCESSING WITHOUT TRANSFER (BYPASS) AND DISTRIBUTION |

INFORMATION PROCESSING APPARATUS, NON-TRANSITORY COMPUTER READABLE MEDIUM STORING INFORMATION PROCESSING PROGRAM, AND INFORMATION PROCESSING SYSTEM

CROSS-REFERENCE TO RELATED APPLICATIONS

This application is based on and claims priority under 35 USC 119 from Japanese Patent Application No. 2018-082419 filed Apr. 23, 2018.

BACKGROUND (i) Technical Field

The present invention relates to an information processing apparatus, a non-transitory computer readable medium storing an information processing program, and an information processing system.

(ii) Related Art

JP2017-128041A discloses an image forming apparatus having a server function, as follows. An object thereof is to secure performance or reliability of a print job even in a case where printing processing and server processing are performed in parallel. The image forming apparatus includes a CPU, a temperature measuring unit that measures the temperature of the CPU, a printing processing unit that performs printing processing with a print engine having a heat source, a server processing unit that performs server processing of transmitting the required data to a client terminal in response to a processing request received from the client terminal, a parallel execution control unit that enables printing processing of the printing processing unit and server processing of the server processing unit to be performed in the CPU in parallel, and a request restriction unit that restricts server processing corresponding to the processing request from the server processing unit, based on the temperature of the CPU, which has been measured by the temperature measuring unit.

SUMMARY

For example, in an information processing apparatus such as a copying machine, information is received from a communication device, and processing on the received information is performed. However, the information processing apparatus has an original function (for example, a copying function in a case of a copying machine). In a case where the information processing apparatus performs processing of the original function, or multiple communication devices are provided, processing in the information processing apparatus is delayed.

Aspects of non-limiting embodiments of the present disclosure relate to an information processing apparatus, a non-transitory computer readable medium storing an information processing program, and an information processing system in which it is possible to suppress delay of processing in the information processing apparatus in comparison to a case where the information processing apparatus normally processes information acquired from communication devices.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus which includes an acquisition section that acquires information from a communication device, and a switching section that switches an apparatus to perform processing on the information acquired from the communication device, between the information processing apparatus and another information processing apparatus, in accordance with a state of the information processing apparatus and a state of the communication device.

BRIEF DESCRIPTION OF THE DRAWINGS

Exemplary embodiment(s) of the present invention will be described in detail based on the following figures, wherein:

FIG. 3 is a flowchart illustrating a process example according to the exemplary embodiment;

FIG. 5 is a diagram illustrating a data structure example of an if-then table;

FIG. 8 is a diagram illustrating another data structure example of the if-then table;

FIG. 9 is a diagram illustrating still another data structure example of the if-then table;

DETAILED DESCRIPTION

Hereinafter, an example of an exemplary embodiment for realizing the present invention will be described with reference to the drawings.

Figure 1:
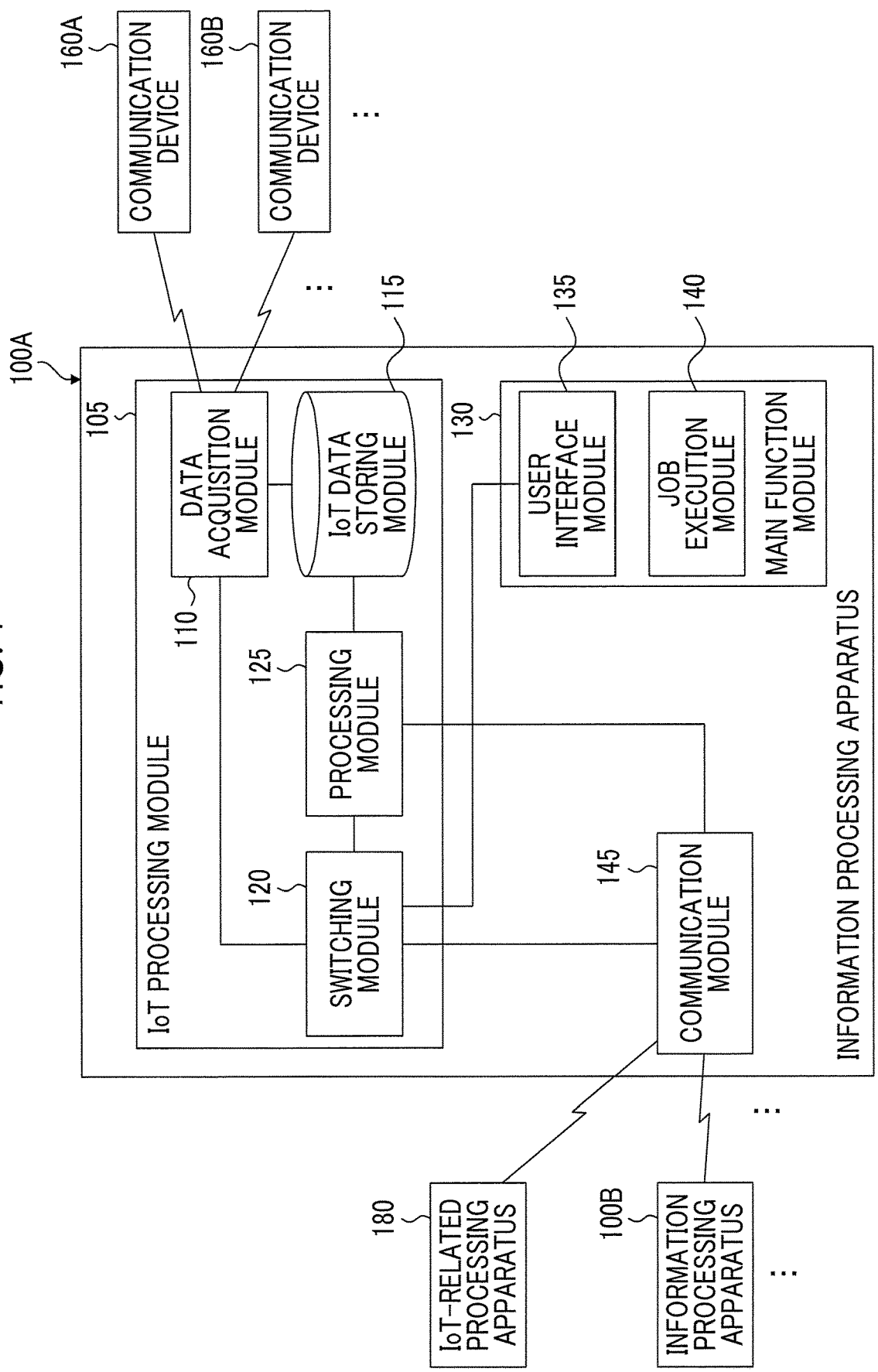
FIG. 1 is a module configuration diagram conceptually illustrating a configuration example according to an exemplary embodiment.

FIG. 1 is a module configuration diagram conceptually illustrating a configuration example according to an exemplary embodiment.

A module means a component of software (computer program), hardware, and the like, which is generally logically separable. Thus, a module in the exemplary embodiment means not only a module on a computer program but also a module in a hardware configuration. In the exemplary embodiment, a computer program for functioning as modules (a program for causing a computer to perform each procedure, a program for causing a computer to function as each piece of means, or a program for causing a computer to realize each function), a system, and a method will be described together. For convenient descriptions, "store something", "cause something to be stored", and equivalent words are used. However, these words mean being stored in a storage device or controlling something to be stored in a storage device in a case where the exemplary embodiment is embodied as a form of a computer program. The module may correspond to a function one-to-one. In a case of a mounted module, one module may be configured by one program, or a plurality of modules may be configured by one program. Reversely, one module may be configured with a plurality of programs. A plurality of modules may be performed by one computer, or one module may be performed by a plurality of computers in a distributed or parallel environment. One module may include another module. In the following descriptions, "connection" is used in a case of a physical connection and is also used in a case of a logical connection (transmission and reception of data, instruction, reference relationship between pieces of data, log-in, and the like). "Being predetermined" means being determined before a target process. In addition, "being determined" is used to include the meaning of being determined in accordance with a situation or a state at a time point before a target process or with a situation or a state until the time point even though the process according to the exemplary embodiment has started, in addition to the meaning of being determined before a process according to the exemplary embodiment starts. In a case where a plurality of "predetermined values" are provided, the values may be different from each other, or two or more values (also including all values) among the plurality of values may be equal to each other. A description of "performing B in a case of A" is used to mean "determining whether or not to be A, and performing B in a case of being determined to be A". However, a case where the determination of whether or not something is A is not required is excluded. In a case of enumerating objects, for example, "A, B, and C", the enumerated objects are just examples so long as particular statements are not made. This case includes a case (for example, only A) of selection only one among the objects.

The system or the device is configured in a manner that a plurality of computers, hardware, devices, and the like are connected to each other by communication means such as a network (including one-to-one corresponding communication connection), or the system or the device is realized by one computer, hardware, a device, or the like. "The device" and "the system" may be used synonymously with each other. "The system" does not include just a social mechanism (social system) which is an artificial arrangement".

Target information is read out from a storage device for each process performed by each module or for each process in a case where a plurality of processes are performed in one module. After the process has been performed, a process result is written in the storage device. Thus, descriptions regarding being read out from a storage device before a process and being written in the storage device after the process may be omitted. Here, the storage device may include a hard disk, a random access memory (RAM), an external storage medium, a storage device connected via a communication line, a register in a central processing unit (CPU), and the like.

In the exemplary embodiment, an information processing apparatus 100 (information processing apparatus 100A, information processing apparatus 100B) performs processing on information acquired from a communication device 160. As illustrated in the example of FIG. 1, the information processing apparatus 100 includes an IoT processing module 105, a main function module 130, and a communication module 145. For example, the information processing apparatus 100 is an image forming apparatus capable of processing IoT data.

The IoT processing module 105 includes a data acquisition module 110, an IoT data storing module 115, a switching module 120, and a processing module 125. The IoT processing module 105 processes information acquired from the communication device 160.

The data acquisition module 110 is connected with the IoT data storing module 115, the switching module 120, a communication device 160A, a communication device 160B, and the like. For example, the data acquisition module is connected with the communication device 160 by a short-range wireless communication such as Bluetooth (registered trademark) and Wi-Fi. For example, a wireless communication is preferable, but a wired communication by a universal serial bus (USB) and the like may be provided.

The data acquisition module 110 acquires information (also referred to as data below) from the communication device 160. The data acquisition module causes the acquired data to be stored in the IoT data storing module 115, and informs the switching module 120 of the number of communication devices 160 from which pieces of information are acquired (may be the number of communication devices 160 capable of communicating with the data acquisition module), the volume of the acquired data, and the like.

The IoT data storing module 115 is connected with the data acquisition module 110 and the processing module 125. The IoT data storing module 115 stores data acquired by the data acquisition module 110. The processing module 125 performs processing on data in the IoT data storing module 115.

The switching module 120 is connected with the data acquisition module 110, the processing module 125, the main function module 130, and the communication module 145. The switching module 120 switches an apparatus to perform processing on information acquired from the communication device 160 between the own information processing apparatus 100 or the other information processing apparatus 100 (for example, information processing apparatus 100B), in accordance with the state of this information processing apparatus 100 and the state of the above communication device 160.

The switching module 120 may transfer all pieces of information acquired from the communication device 160 to the other information processing apparatus 100. Transfer herein also refers to bypass because of transferring all pieces of information. In this information processing apparatus 100, processing (processing by the processing module 125) is not performed on the information acquired from the communication device 160.

In this case, the switching module 120 may acquire the state of the other information processing apparatus 100. The switching module may determine whether or not to transfer all pieces of information to the other information processing apparatus 100, in accordance with the acquired state.

The switching module 120 may transfer some pieces of information acquired from the communication device 160 to the other information processing apparatus 100.

In this case, the switching module 120 may acquire the state of the other information processing apparatus 100 and determine whether or not to transfer some pieces of information to the other information processing apparatus 100 in accordance with the acquired state.

"The state of this information processing apparatus 100" as the condition for switching in the switching module 120 may include whether or not a user is operating this information processing apparatus 100 or whether or not this information processing apparatus 100 is in the process of performing a job.

More specifically, in a case where a user is operating this information processing apparatus 100, or this information processing apparatus 100 is in the process of performing a job, the switching module 120 may transfer information acquired from the communication device 160 to the other information processing apparatus 100.

"The state of the communication device 160" as the condition for switching in the switching module 120 may include the number of communication devices from which this information processing apparatus 100 acquires information.

More specifically, in a case where the number of communication devices 160 is equal to or greater than a predetermined value, the switching module 120 may transfer information acquired from the communication device 160 to the other information processing apparatus 100.

"The state of the communication device 160" includes the communication device 160 being starting or stopping, the type of communication device 160 (for example, camera, speaker, microphone, wearable terminal, and display), a distance between the information processing apparatus 100 and the communication device 160, and the like. For example, in a case where the distance between the information processing apparatus 100 and the communication device 160 is smaller than or equal to or smaller than a predetermined threshold, it may be determined that this information processing apparatus 100 performs processing on the information.

The switching module 120 may switch an apparatus to perform processing on information acquired from the communication device 160 between this information processing apparatus 100 and the other information processing apparatus 100 (for example, information processing apparatus 100B), in accordance with the details of processing which will be described later and is performed by the processing module 125. The switching may be controlled such that a user interface module 135 may select the apparatus at a certain timing.

More specifically, in a case where processing of specifying a flow of a person and a document relating to a business flow is performed, the switching module 120 may transfer all pieces of information acquired from the communication device 160 to the other information processing apparatus 100. In a case where character recognition processing of a scanned document is performed, the switching module 120 may determine whether or not to transfer some pieces of information acquired from the communication device 160.

The processing module 125 is connected with the IoT data storing module 115, the switching module 120, and the communication module 145. The processing module 125 performs processing on at least information acquired by the data acquisition module 110. In addition to the information acquired by the data acquisition module 110, the processing module may perform processing on information to be processed by a job execution module 140 (for example, in a case where the information processing apparatus 100 is an image processing apparatus, electronic document as a print target or scanned document).

The processing module 125 supports a so-called edge processing function between a sensor and a cloud (IoT-related processing apparatus 180). That is, in a case where a large volume of data from the communication device 160 is directly transmitted to the IoT-related processing apparatus 180, congestion occurs, and processing in the IoT-related processing apparatus 180 is delayed. However, with the processing of the processing module 125, it is possible to reduce the volume of data transmitted to the IoT-related processing apparatus 180 and to exhibit the function of the IoT-related processing apparatus 180.

Examples of the processing performed by the processing module 125 include the processing of specifying the flow of a person and a document relating to the business flow. Specifically, in the above processing, employees on a path of delivering a document obtained by printing (document paper) or an electronic document are specified. In addition, the processing of specifying the flow of a person and a document relating to the business flow includes, for example, extraction processing of a movement (so-called motion line) of an employee in an office, in which difference extraction processing between documents for managing the version of the document is performed, and character recognition processing of scanned document is performed.

The main function module 130 includes the user interface module 135 and the job execution module 140 and is connected with the switching module 120. The main function module 130 performs processing of a function of the information processing apparatus 100.

The user interface module 135 presents a menu operable by a user to a touch panel provided in the information processing apparatus 100. The user interface module receives an operation of the user on the menu, and presents a processing result by the job execution module 140 (message or the like, for example, indicating that printing is completed).

The job execution module 140 causes the information processing apparatus 100 to perform a job. For example, in a case where the information processing apparatus 100 is an image processing apparatus, printing processing, scanning processing, fax transmission and reception processing, and copying processing are provided.

The communication module 145 is connected with the switching module 120 and the processing module 125 of the IoT processing module 105, the IoT-related processing apparatus 180, and the information processing apparatus 100B. The communication module 145 is connected with the information processing apparatus 100B and the IoT-related processing apparatus 180 via a communication line.

In a case where not the information processing apparatus 100A performs processing on information (all or some pieces of information) but the information processing apparatus 100B may perform processing, the communication module 145 may transmit information (information which is originally to be processed by the information processing apparatus 100A (processing module 125)) to the information processing apparatus 100B.

The communication device 160 (communication device 160A, communication device 160B, or the like) is connected with the data acquisition module 110 of the IoT processing module 105 in the information processing apparatus 100. The communication device 160 has a communication function and transmits information, for example, detected by the communication device 160 to the information processing apparatus 100. For example, an internet-of-things (IoT) device is provided as the communication device 160. IoT data is provided as data transmitted from the communication device 160 to the information processing apparatus 100. Examples of the IoT device include a portable information terminal (smart phone and the like), a wearable terminal, and a camera which are used by a user. Examples of the IoT data include a user identification (ID) for uniquely specifying a user holding a portable information terminal and position information. In a case of a camera, an image obtained by capturing and the like are provided as the IoT data.

The IoT-related processing apparatus 180 is connected with the communication module 145 of the information processing apparatus 100A. The IoT-related processing apparatus 180 receives information (processing result) obtained in a manner that the processing module 125 performs processing on information acquired from the communication device 160. The IoT-related processing apparatus 180 performs service processing by using the received information. Here, examples of the service processing include, for example, processing of analyzing the behavior, the work, or the like of an employee, and extracting an object of the work or creating the proposal of improving work efficiency. For example, an advice of excluding printing of a useless document by using a flow of a person and a document is provided. The IoT-related processing apparatus may introduce products, software, and the like for an efficient work.

The information processing apparatus 100B is connected with the communication module 145 of the information processing apparatus 100A. The information processing apparatus 100B has a function equivalent to that of the information processing apparatus 100A. Thus, similar to the information processing apparatus 100A, the information processing apparatus 100B communicates with a communication device 160 (communication device 160 different from the communication device 160A and the communication device 160B) and processes information acquired from this communication device 160. The information processing apparatus 100B may be a product which is completely the same as the information processing apparatus 100A. However, it is not necessary that the information processing apparatuses 100A and 100B are completely the same as each other. For example, the type of the information processing apparatus 100B may be different from that of the information processing apparatus 100A. The information processing apparatus 100B may have a function of the main function module 130, which is different from that in the information processing apparatus 100A (for example, the information processing apparatus 100A is a multifunction device, but the information processing apparatus 100B is a scanner).

The information processing apparatus 100B receives an inquiry from the information processing apparatus 100A (inquiry of whether or not the information processing apparatus 100B may take over processing which is originally performed by the information processing apparatus 100A (processing module 125)). In a case where the information processing apparatus 100B is capable of performing processing, the information processing apparatus 100B acquires information from the information processing apparatus 100A and performs processing.

Figure 2:
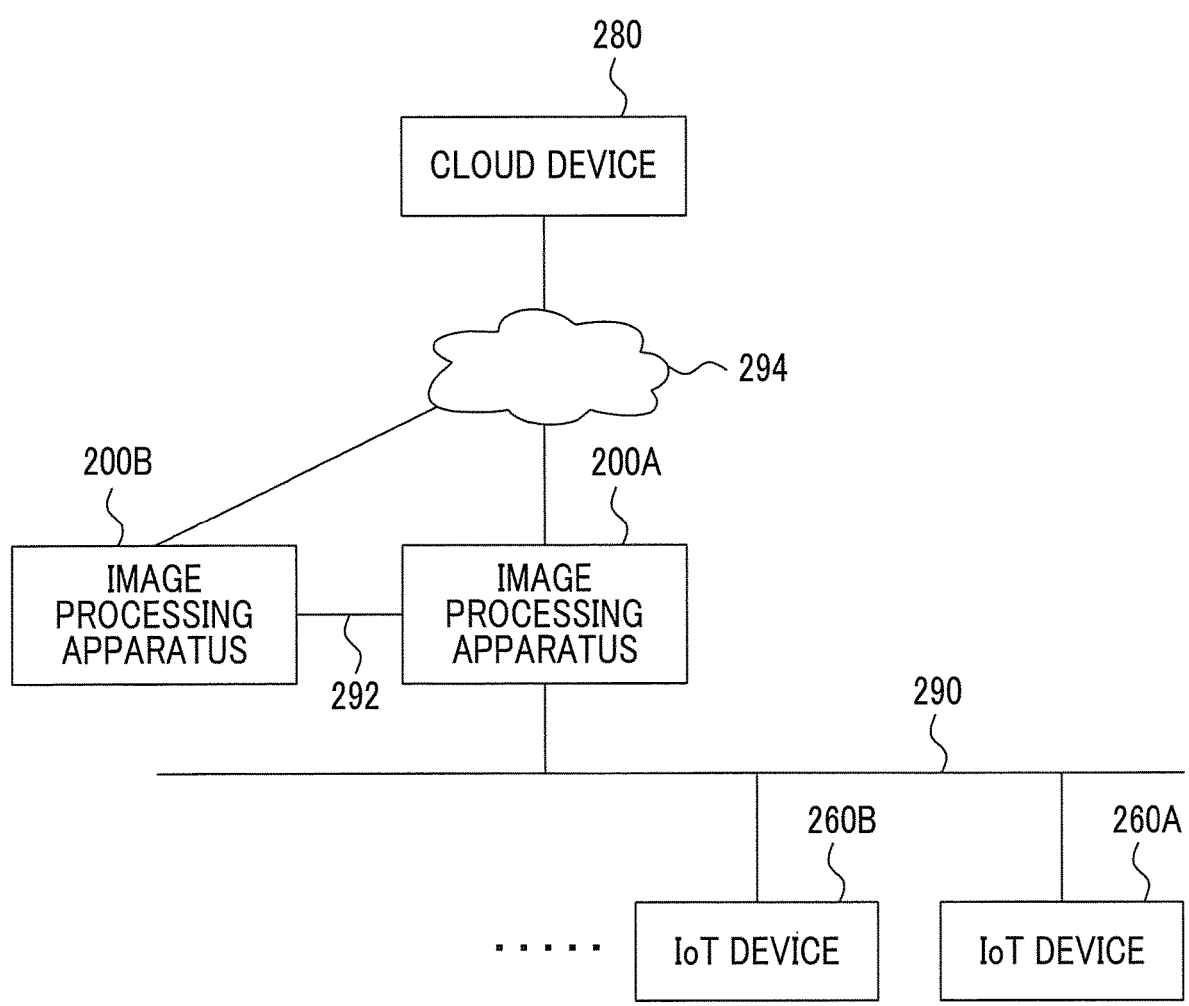
FIG. 2 is a diagram illustrating a system configuration example using the exemplary embodiment.

FIG. 2 is a diagram illustrating a system configuration example using the exemplary embodiment.

An image processing apparatus 200 is a specific example of the information processing apparatus 100. An IoT device 260 is a specific example of the communication device 160. A cloud device 280 is a specific example of the IoT-related processing apparatus 180. The IoT device 260 includes a sensor, an actuator, and the like.

The image processing apparatus 200A is connected with the image processing apparatus 200B via a communication line 292. The communication line 292 may be wireless, wired, or a combination of a wireless communication and a wired communication. For example, an intranet as a communication infrastructure may be provided.

The image processing apparatus 200A, the IoT device 260A, and the IoT device 260B are connected to each other via a communication line 290. The communication line 290 may be wireless, wired, or a combination of a wireless communication and a wired communication. For example, a short-range wireless communication such as Bluetooth (registered trademark) and Wi-Fi may be provided.

The image processing apparatus 200A, the image processing apparatus 200B, and the cloud device 280 are connected to each other via a communication line 294. The communication line 294 may be wireless, wired, or a combination of a wireless communication and a wired communication. For example, the Internet and an intranet as a communication infrastructure may be provided.

The image processing apparatus 200A (or image processing apparatus 200B by switching processing of the image processing apparatus 200A) performs intermediate processing on data from the IoT device 260A, and delivers a processing result thereof to the cloud device 280. The cloud device 280 provides a cloud service for a user of the cloud device 280.

FIG. 3 is a flowchart illustrating a process example according to the exemplary embodiment (switching module 120).

In Step S302, the switching module detects the state of the user interface module 135.

In Step S304, the switching module detects the state of the job execution module 140.

In Step S306, the switching module detects the state of a communication device 160 from which data is acquired.

In Step S308, the switching module performs switching in accordance with the states of the user interface module 135, the job execution module 140, and the communication device 160 (states detected in Step S302, Step S304, and Step S306). In a case of "not performing neither transfer nor distribution", the process proceeds to Step S310. In a case of transfer, the process proceeds to Step S312. In a case of distribution, the process proceeds to Step S314. Determination processing in this step is performed by using an if-then table 500 illustrated in the example of FIG. 5, which will be described later.

In Step S310, this information processing apparatus 100 (processing module 125) performs processing.

In Step S312, this information processing apparatus 100 transfers all pieces of data from the communication device 160 to the other information processing apparatus 100 (information processing apparatus 100B). The other information processing apparatus 100 (processing module 125 of the information processing apparatus 100B) performs processing.

In Step S314, this information processing apparatus 100 transfers some pieces of data from the communication device 160 to the other information processing apparatus 100 (information processing apparatus 100B). The information processing apparatus 100 (processing module 125) and the other information processing apparatus 100 (processing module 125 of the information processing apparatus 100B) perform processing.

Figure 4A:
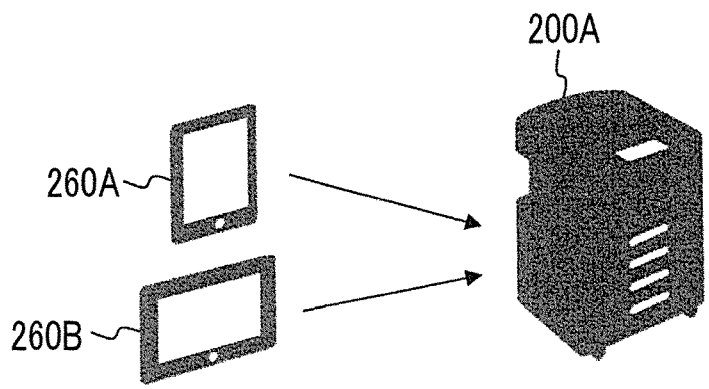
FIGS. 4A to 4C are diagrams illustrating the process example according to the exemplary embodiment.
Figure 4B:
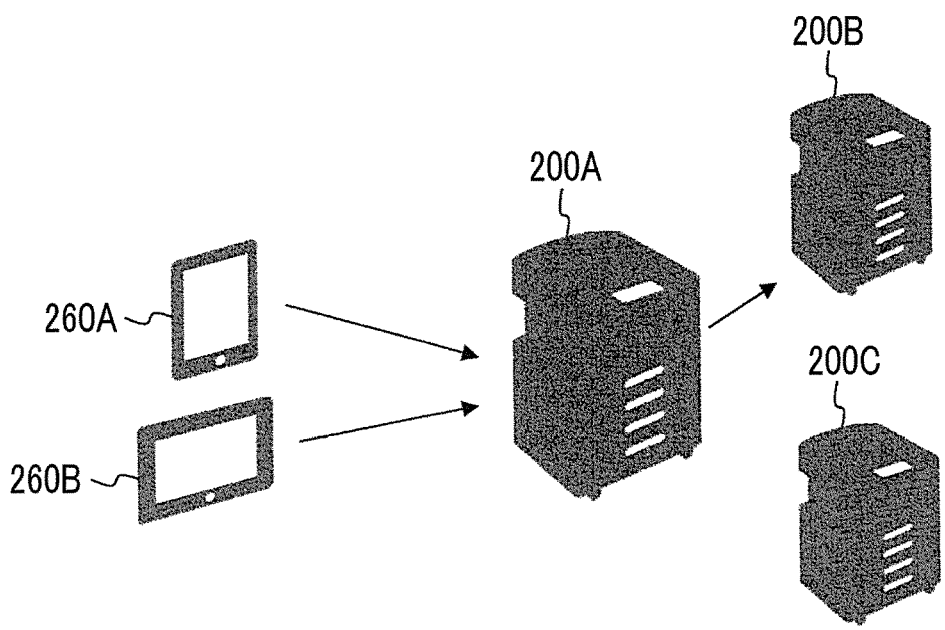
Figure 4C:
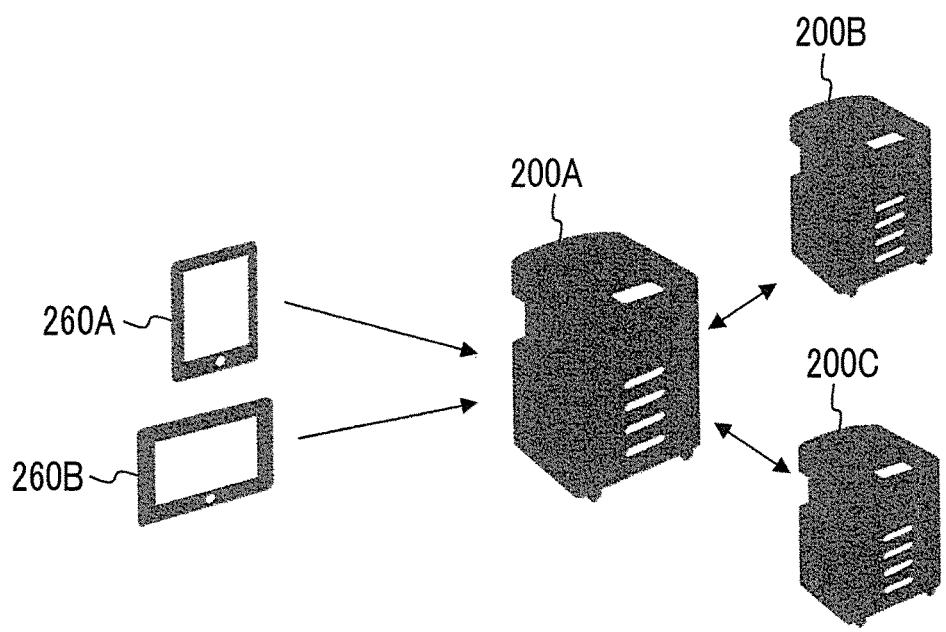

FIGS. 4A to 4C are diagrams illustrating a process example according to the exemplary embodiment. A pattern of data collection, accumulation, and processing is changed depending on the state of the image processing apparatus 200 and the number of IoT devices 260 to be connected.

The example illustrated in FIG. 4A shows processing (processing of a normal pattern) in Step S310. The image processing apparatus 200A collects, accumulates, and processes data from the IoT device 260. For example, in a case where the user does not operate the image processing apparatus 200A, and the image processing apparatus 200A does not perform a job, or in a case where the image processing apparatus 200A is performing power saving, and in a case where the number of IoT devices 260 is small, only the image processing apparatus 200A performs processing.

The example illustrated in FIG. 4B shows processing (processing of Distribution Pattern 1) in Step S312. Distribution Pattern 1 is a pattern of bypassing data to the other image processing apparatus 200B. This corresponds to a case where the image processing apparatus 200B may collect, accumulate, and process data from the IoT device 260 instead of the image processing apparatus 200A. For example, in a case where a user operates the image processing apparatus 200A or the image processing apparatus 200A performs a job, the image processing apparatus 200B is caused to perform processing instead of the image processing apparatus 200A.

The example illustrated in FIG. 4C shows processing (processing of Distribution Pattern 2) in Step S314. Distribution Pattern 2 is a pattern in which a plurality of image processing apparatuses 200 (in this case, image processing apparatus 200A, image processing apparatus 200B, and image processing apparatus 200C) performs processing in a distributed manner. This corresponds to a case where not only the image processing apparatus 200A but also the image processing apparatus 200B and the image processing apparatus 200C collect, accumulate, and process data from the IoT device 260. For example, in a case where a user does not operate the image processing apparatus 200A, and the image processing apparatus 200A does not perform a job, or in a case where the image processing apparatus 200A is performing power saving, and in a case where the number of IoT devices 260 is large, processing is performed by the image processing apparatus 200A, the image processing apparatus 200B, and the image processing apparatus 200C.

FIG. 5 is a diagram illustrating a data structure example of an if-then table 500.

The if-then table 500 includes a No field 505, a state field 510 of an image processing apparatus, a state field 515 of an IoT device, and a transfer (bypass) or distribution field 520. The No field 505 stores No. The state field 510 of an image processing apparatus stores the state of the image processing apparatus 200. The state field 515 of an IoT device stores the state of the IoT device 260. The transfer (bypass) or distribution field 520 stores information indicating transfer (bypass) processing or distributed processing. That is, the switching module 120 (processing in Step S308) selects processing corresponding to the contents in the transfer (bypass) or distribution field 520, under a condition of the contents in the state field 510 of an image processing apparatus and the contents in the state field 515 of an IoT device.

In an item of No. 1 (first line), in a case where the state of the image processing apparatus 200 is "not operated by a user and does not perform a job", and the state of the IoT device 260 is that "the number of IoT devices is small", "this information processing apparatus 100 performs processing without transfer (bypass) and distribution".

In an item of No. 2 (second line), in a case where the state of the image processing apparatus 200 is "not operated by a user and does not perform a job", and the state of the IoT device 260 is that "the number of IoT devices is medium to large", "distributed processing" is performed.

In an item of No. 3 (third line), in a case where the state of the image processing apparatus 200 is "being operated by a user or performs a job", and the state of the IoT device 260 is that "the number of IoT devices is small", "transfer (bypass) processing" is performed.

In an item of No. 4 (fourth line), in a case where the state of the image processing apparatus 200 is "being operated by a user or performs a job", and the state of the IoT device 260 is that "the number of IoT devices is medium to large", "transfer (bypass) processing" is performed.

In an item of No. 5 (fifth line), in a case where the state of the image processing apparatus 200 is "performing power saving", and the state of the IoT device 260 is that "the number of IoT devices is small", "this information processing apparatus 100 performs processing without transfer (bypass) and distribution.

In an item of No. 6 (sixth line), in a case where the state of the image processing apparatus 200 is "performing power saving", and the state of the IoT device 260 is that "the number of IoT devices is medium to large", "distributed processing" is performed.

Figure 6:
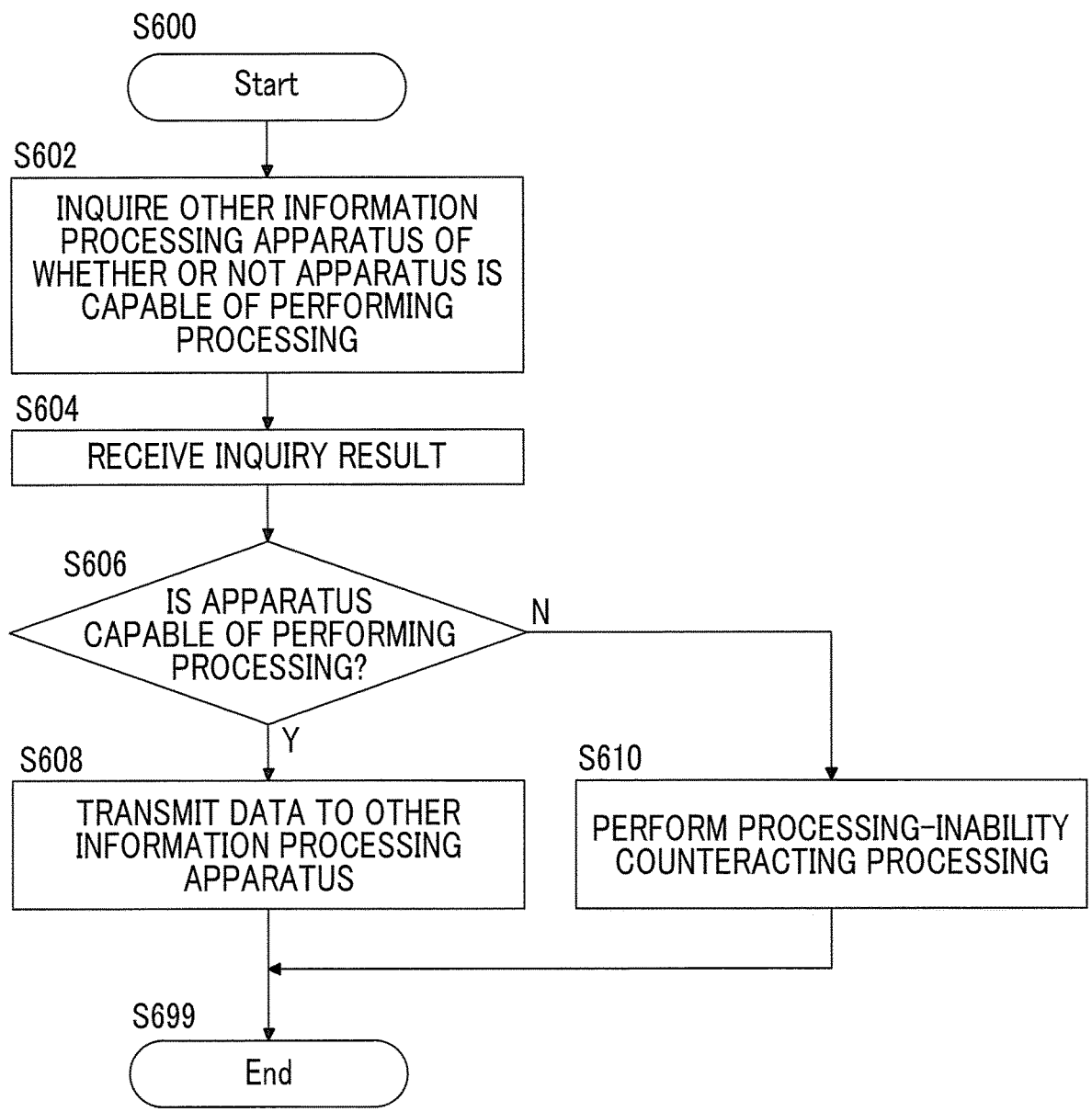
FIG. 6 is a flowchart illustrating a process example according to the exemplary embodiment.

FIG. 6 is a flowchart illustrating a process example according to the exemplary embodiment.

In the process of Step S312 or Step S314, it is necessary that another information processing apparatus 100 as a transmission destination of data is selected. However, regarding this process, with processing illustrated in the example of FIG. 6, an information processing apparatus 100 as a destination to which data is transmitted may be selected.

In Step S602, the communication module 145 inquires of the other information processing apparatus 100 (for example, information processing apparatus 100B) whether or not the information processing apparatus is capable of performing processing. The communication module may perform inquiring of a plurality of information processing apparatus 100.

In Step S604, the communication module 145 receives an inquiry result from the other information processing apparatus 100.

In Step S606, the processing module 125 determines whether or not the inquiry result indicates being capable of performing processing. In a case of being capable of performing processing, the process proceeds to Step S608. In other cases, the process proceeds to Step S610.

In Step S608, the communication module 145 transmits data to the other information processing apparatus 100 which has transmitted a response of being capable of performing processing.

In Step S610, the processing module 125 performs processing-inability counteracting processing.

After Step S608, the information processing apparatus 100 transmits data to the other information processing apparatus 100.

The other information processing apparatus 100 receives the data and performs processing. Then, the other information processing apparatus 100 transmits a processing result to the information processing apparatus 100. The information processing apparatus 100 transmits the processing result to the IoT-related processing apparatus 180. Alternatively, the other information processing apparatus 100 may directly transmit the processing result to the IoT-related processing apparatus 180.

As the processing of Step S610, for example, a message indicating that not-processed data is provided yet may be transmitted to the IoT-related processing apparatus 180, and inquiring (processing in this flowchart) may be performed for the other information processing apparatus 100.

Figure 7:
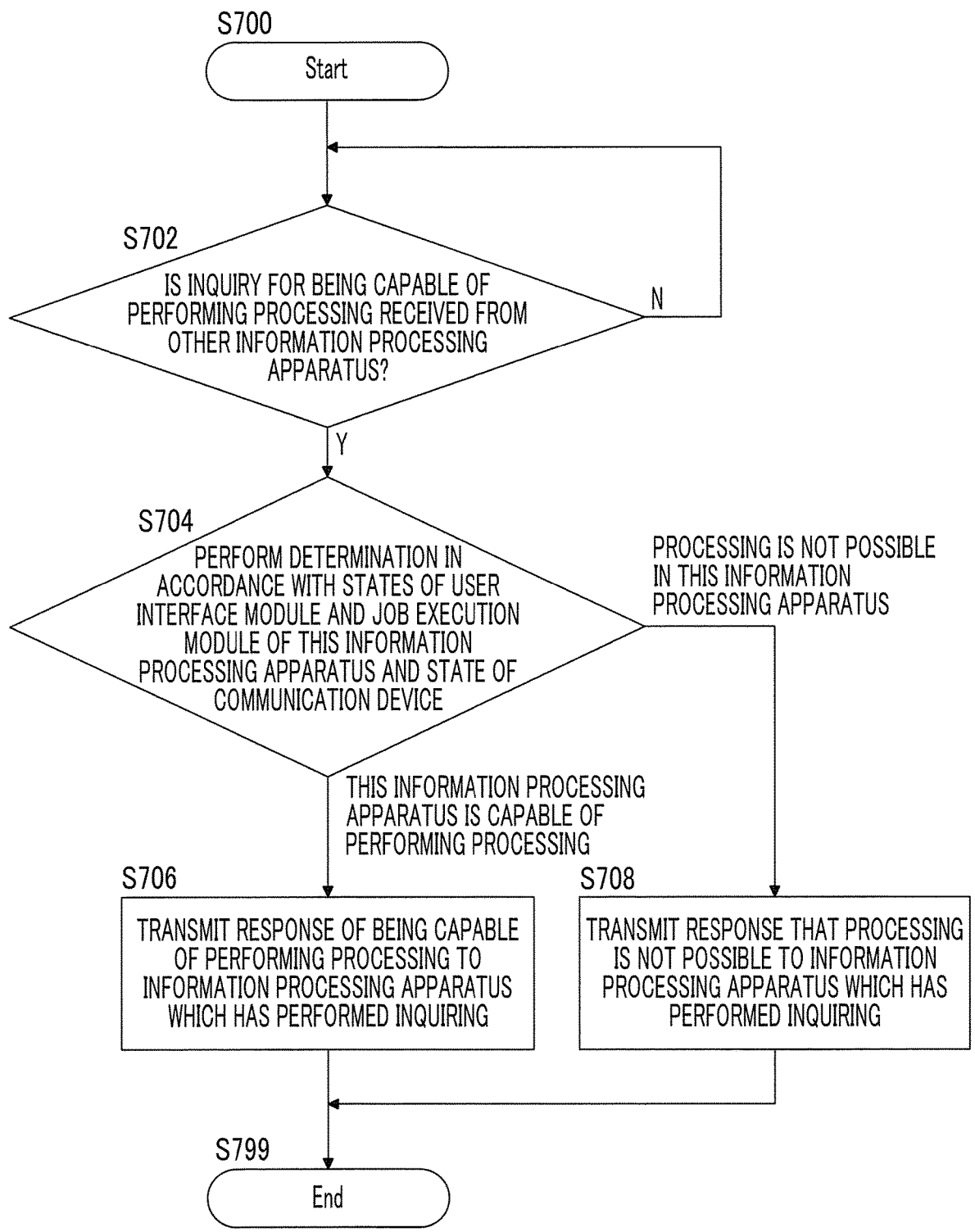
FIG. 7 is a flowchart illustrating a process example according to the exemplary embodiment.

FIG. 7 is a flowchart illustrating a process example according to the exemplary embodiment. FIG. 7 corresponds to the processes of the flowchart illustrated in the example of FIG. 6. FIG. 7 illustrates processing of an information processing apparatus 100 which has received the inquiry through Step S602.

In Step S702, it is determined whether or not an inquiry of being capable of performing processing is received from the other information processing apparatus 100. In a case of being received, the process proceeds to Step S704. In other cases, waiting is performed until the inquiry is received. The inquiry includes processing details, the number of communication devices 160, the data volume, and the like.

In Step S704, determination is performed in accordance with the states of the user interface module 135 and the job execution module 140 of the information processing apparatus 100 and the state of the communication device 160. In a case where "the information processing apparatus 100 is capable of performing processing", the process proceeds to Step S706. In a case where the information processing apparatus 100 performing processing is not possible", the process proceeds to Step S708. For example, the determination may be performed by using the if-then table 500. That is, in a case where "processing by the information processing apparatus 100 without transfer (bypass) and distribution" is obtained by using the if-then table 500, the process may proceed to Step S706. In other cases, the process may proceed to Step S708. In a case where "distributed processing" is obtained by using the if-then table 500, the process may proceed to Step S706. A response of being capable of performing processing may be transmitted under a condition of performing "distributed processing" (further, the other information processing apparatus 100 is also caused to perform processing). In other cases, the process may proceed to Step S708.

In Step S706, a response of being capable of performing processing is transmitted to the information processing apparatus 100 which has performed inquiring.

In Step S708, a response of being not capable of performing processing is transmitted to the information processing apparatus 100 which has performed inquiring.

In addition to the if-then table 500 illustrated in the example of FIG. 5, an if-then table 800 or an if-then table 900 may be used.

FIG. 8 is a diagram illustrating a data structure example of the if-then table 800. The if-then table 800 includes a No field 805, a state field 810 of an image processing apparatus, and a transfer (bypass) or distribution field 815. The No field 805 stores No. The state field 810 of an image processing apparatus stores the state of the image processing apparatus 200. The transfer (bypass) or distribution field 815 stores information indicating transfer (bypass) processing or distributed processing. That is, the switching module 120 (processing in Step S308) selects processing corresponding to the contents in the transfer (bypass) or distribution field 815, under a condition of the contents in the state field 810 of an image processing apparatus.

In an item of No. 101 (first line), in a case where the state of the image processing apparatus 200 is "being operated by a user", "transfer (bypass) processing" is performed.

In an item of No. 102 (second line), in a case where the state of the image processing apparatus 200 is "in the process of performing a job", "distributed processing" is performed.

In an item of No. 103 (third line), in a case where the state of the image processing apparatus 200 is "not operated by a user and does not perform a job", "this information processing apparatus 100 performs processing without transfer (bypass) and distribution".

In an item of No. 104 (fourth line), in a case where the state of the image processing apparatus 200 is "performing power saving", "this information processing apparatus 100 performs processing without transfer (bypass) and distribution".

FIG. 9 is a diagram illustrating a data structure example of the if-then table 900.

The if-then table 900 includes a No field 905, a state field 910 of an IoT device, and a transfer (bypass) or distribution field 915. The No field 905 stores No. The state field 910 of an IoT device stores the state of the IoT device 260. The transfer (bypass) or distribution field 915 stores information indicating transfer (bypass) processing or distributed processing. That is, the switching module 120 (processing in Step S308) selects processing corresponding to the contents in the transfer (bypass) or distribution field 915, under a condition of the contents in the state field 910 of an IoT device.

In an item of No. 201 (first line), in a case where the state of the IoT device 260 is that "cameras of which the number is equal to or greater than A are provided as the IoT device 260", "transfer (bypass) processing" is performed.

In an item of No. 202 (second line), in a case where the state of the IoT device 260 is that "cameras of which the number is equal to or greater than 1 and smaller than A are provided as the IoT device 260", "distributed processing" is performed.

In an item of No. 203 (third line), in a case where the state of the IoT device 260 is that "a camera is not provided as the IoT device 260", "this information processing apparatus 100 performs processing without transfer (bypass) and distribution".

Figure 10:
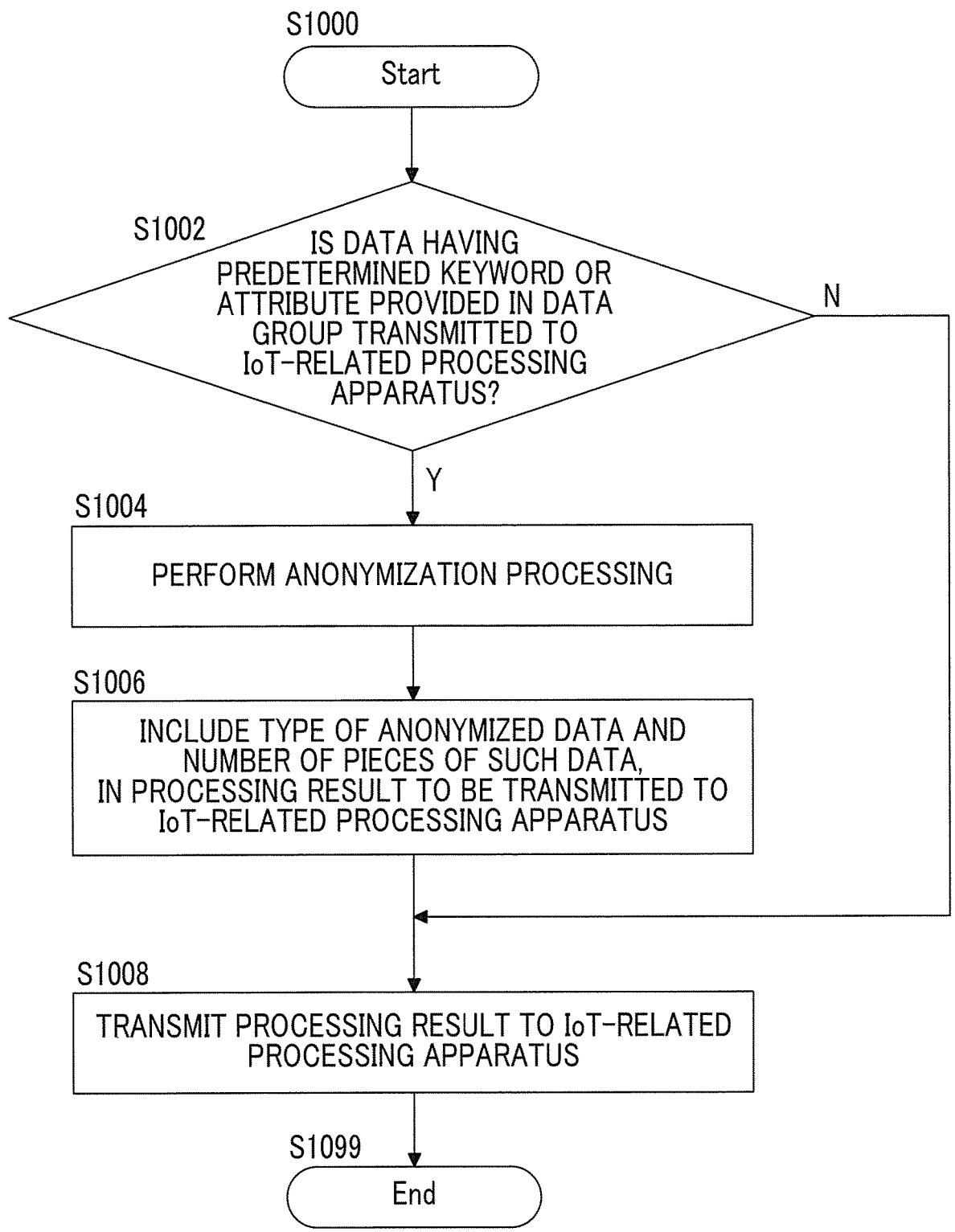
FIG. 10 is a flowchart illustrating a process example according to the exemplary embodiment.

In a case where the communication module 145 transmits a processing result to the IoT-related processing apparatus 180, the processing illustrated in the example of FIG. 10 or may be performed. Anonymization processing may be performed.

FIG. 10 is a flowchart illustrating a process example according to the exemplary embodiment.

In Step S1002, it is determined whether or not data having a predetermined keyword or attribute is provided in a data group transmitted to the IoT-related processing apparatus 180. In a case of being provided, the process proceeds to Step S1004. In other cases, the process proceeds to Step S1008. Here, "data having a predetermined keyword or attribute" is a target of anonymization. For example, a specific affiliation name is provided as the keyword, and the attribute includes a user ID and the birth date.

In Step S1004, anonymization processing is performed. For example, anonymization processing corresponds to deletion, conversion, and the like of target data.

In Step S1006, a processing result to be transmitted to the IoT-related processing apparatus 180 is caused to include the type of anonymized data and the number of pieces of such data. The IoT-related processing apparatus 180 may obtain the type of anonymized data and the number of pieces of such data.

In Step S1008, a processing result is transmitted to the IoT-related processing apparatus 180.

Figure 11:
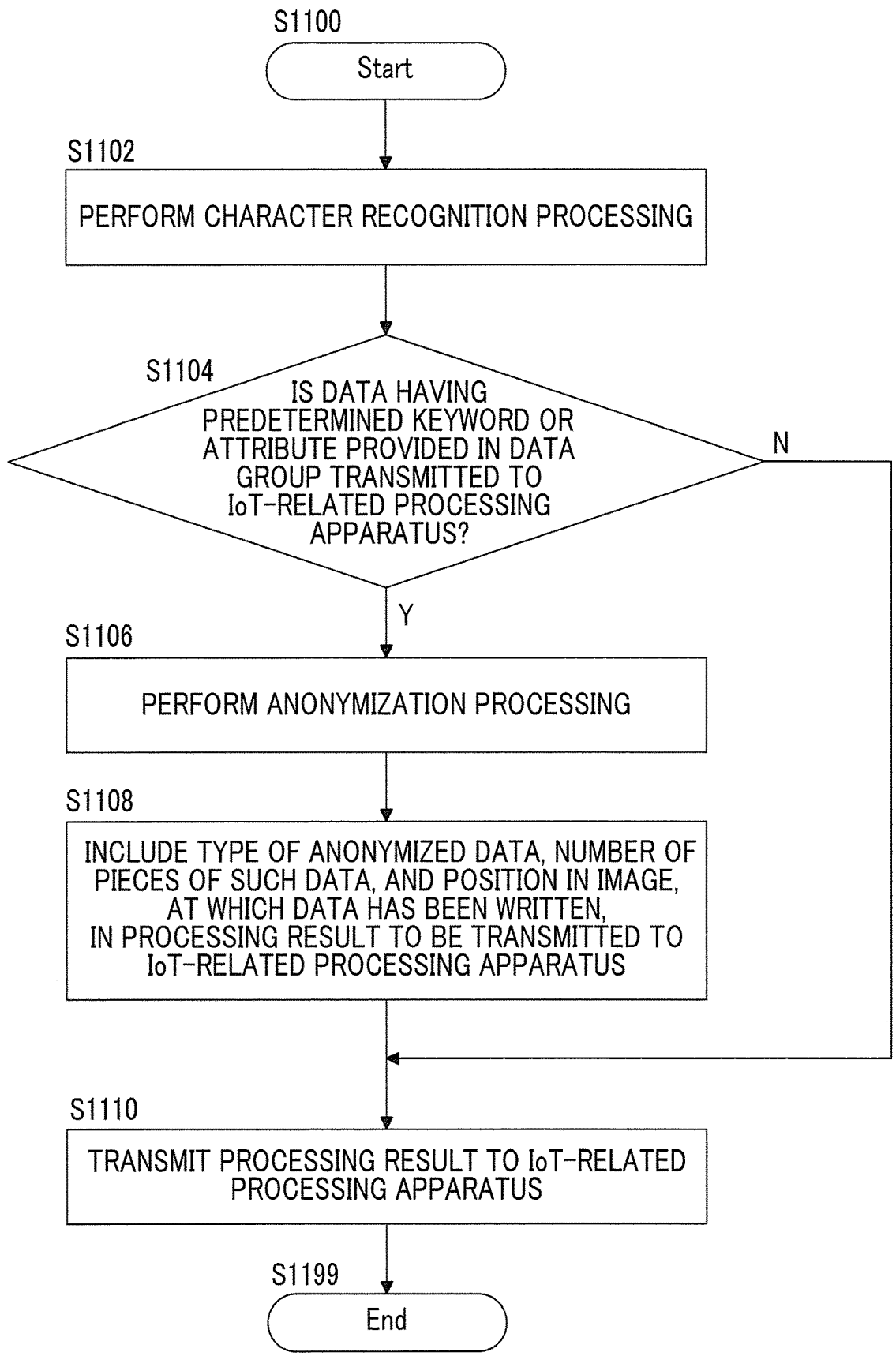
FIG. 11 is a flowchart illustrating a process example according to the exemplary embodiment.

FIG. 11 is a flowchart illustrating a process example according to the exemplary embodiment. IoT data transmitted from the communication device 160 is an image. FIG. 11 illustrates anonymization processing in a case where the processing module 125 performs character recognition processing.

In Step S1102, the processing module 125 performs the character recognition processing.

In Step S1104, it is determined whether or not data having a predetermined keyword or attribute is provided in a data group transmitted to the IoT-related processing apparatus 180. In a case of being provided, the process proceeds to Step S1106. In other cases, the process proceeds to Step S1110. The process of Step S1104 is equivalent to the process of Step S1002.

In Step S1106, anonymization processing is performed. The process of Step S1106 is equivalent to the process of Step S1004.

In Step S1108, a processing result to be transmitted to the IoT-related processing apparatus 180 is caused to include the type of anonymized data, the number of pieces of such data, and the position in an image, at which the data has been written. The IoT-related processing apparatus 180 may obtain the type of anonymized data, the number of pieces of such data, and the position in an image, at which the anonymized data has been written (for example, the position of the name field in a document).

In Step S1110, the processing result is transmitted to the IoT-related processing apparatus 180.

Figure 12:
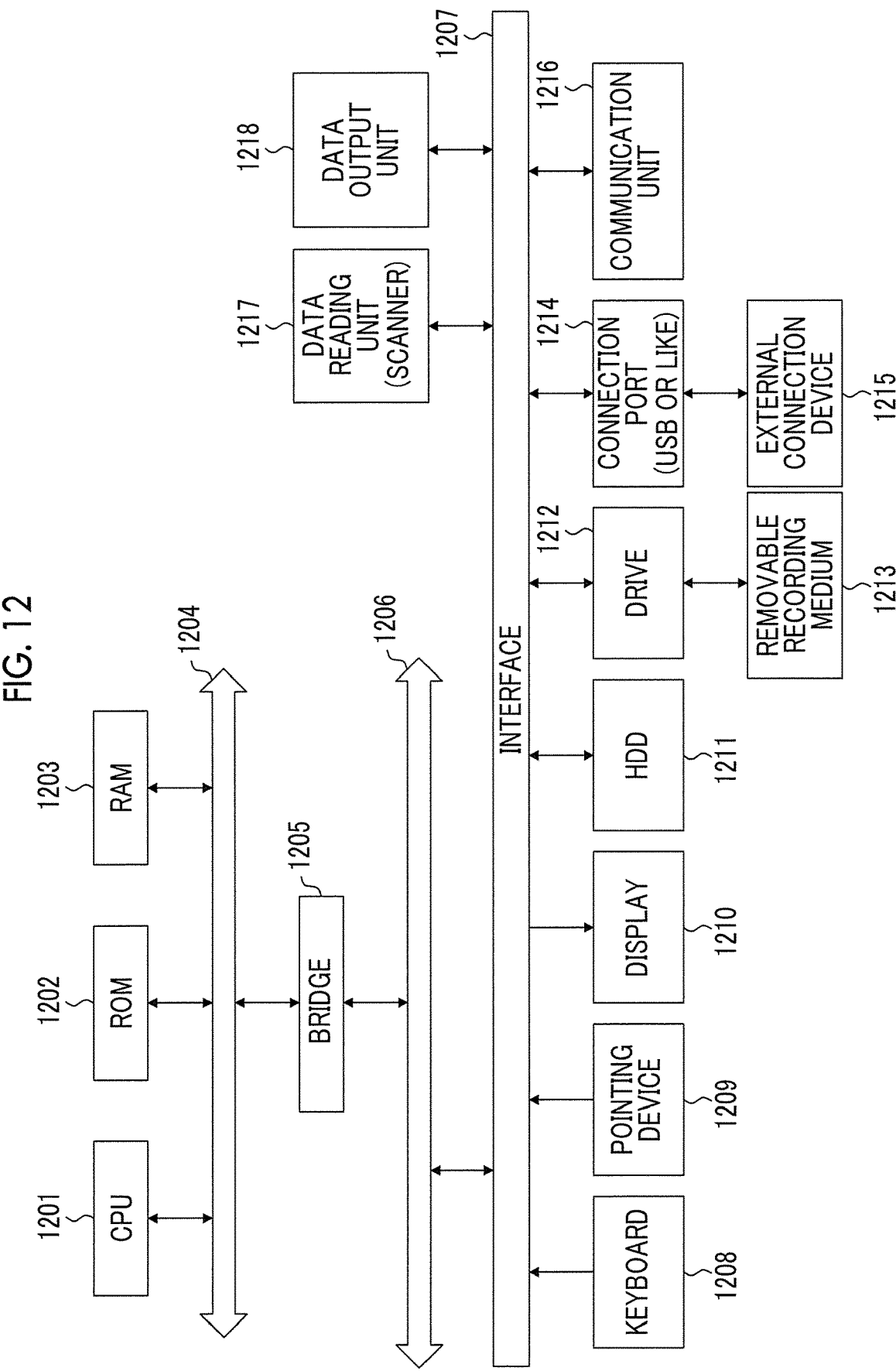
FIG. 12 is a block diagram illustrating a hardware configuration example of a computer that realizes the exemplary embodiment.

A hardware configuration example of the information processing apparatus 100 in the exemplary embodiment will be described with reference to FIG. 12. The configuration illustrated in FIG. 12 is configured by a personal computer (PC), for example. FIG. 12 illustrates a hardware configuration example in which a data reading unit 1217 such as a scanner and a data output unit 1218 such as a printer are provided.

A central processing unit (CPU) 1201 corresponds to a control unit that performs processing in accordance with a computer program in which execution sequences of various modules described in the above-described exemplary embodiment, that is, the IoT processing module 105, the data acquisition module 110, the switching module 120, the processing module 125, the main function module 130, the user interface module 135, the job execution module 140, and the communication module 145 are described.

A read only memory (ROM) 1202 stores a program, an arithmetic parameter, and the like used by the CPU 1201. A random access memory (RAM) 1203 stores a program used in execution of the CPU 1201, a parameter which appropriately varies in the execution, and the like. These components are connected to each other by a host bus 1204 configured by a CPU bus and the like.

The host bus 1204 is connected to an external bus 1206 such as a peripheral component interconnect/interface (PCI) bus, via a bridge 1205.

A keyboard 1208 and a pointing device 1209 such as a mouse are devices operated by an operator. A display 1210 is a liquid crystal display device, a cathode ray tube (CRT), or the like. The display 1210 displays various kinds of information as text or image information. A touch screen or the like having functions of both the pointing device 1209 and the display 1210 may be provided. In this case, regarding realization of the function of the keyboard, a keyboard (also referred to as so-called software keyboard, a screen keyboard, or the like) may be drawn on a screen (touch screen) by software, and thus the function of the keyboard may be realized without physical connection as with the keyboard 1208.

A hard disk drive (HDD) 1211 has a hard disk (may be a flash memory) mounted therein. The HDD 1211 drives the hard disk so as to record or reproduce information or a program executed by the CPU 1201. The hard disk causes the function as the IoT data storing module 115 or the like to be realized. Further, the HDD stores other various kinds of data, various computer programs, and the like.

A drive 1212 reads data or a program recorded in a removable recording medium 1213 mounted thereon, such as a magnetic disk, an optical disk, a magneto-optical disk, or a semiconductor memory. The drive 1212 supplies the data or the program to the RAM 1203 connected to the drive via an interface 1207, the external bus 1206, the bridge 1205, and the host bus 1204. The removable recording medium 1213 may also be used as a data recording area.

A connection port 1214 is a port for connecting an external connection device 1215, and has a connection portion of a USB, IEEE1394, or the like. The connection port 1214 is connected to the CPU 1201 and the like via the interface 1207, and the external bus 1206, the bridge 1205, the host bus 1204, and the like. A communication unit 1216 is connected to a communication line, and performs data communication processing with an external device. For example, the data reading unit 1217 is a scanner and performs reading processing of a document. For example, the data output unit 1218 is a printer and performs output processing of document data.

A hardware configuration of the information processing apparatus 100 illustrated in FIG. 12 shows one configuration example. The exemplary embodiment is not limited to the configuration illustrated in FIG. 12. Any configuration may be made so long as the modules described in the exemplary embodiment may be performed. For example, some modules may be configured by dedicated hardware (for example, application specific integrated circuit (ASIC)). A form in which some modules are connected to a communication line in an external system may be made. Further, a plurality of systems illustrated in FIG. 12 may be connected to each other by a communication line and may operate in cooperation with each other. In particular, the modules may be embedded in a portable information communication device (including portable phone, smart phone, mobile device, wearable computer, and the like), information appliances, a robot, a copying machine, a facsimile, a scanner, a printer, a multifunction device (image processing apparatus having any two or more functions of a scanner, a printer, a copying machine, a facsimile, and the like), and the like, in addition to a personal computer.

In comparison processing in the descriptions of the above-described exemplary embodiment, terms of "being equal to or greater", "being equal to or smaller", "greater than", and "smaller (less) than" may be used as "greater than", "smaller (less) than", "being equal to or greater", and "being equal to or smaller", so long as contradiction does not arise in combination thereof.

The described program may be provided in a state of being stored in a recording medium. The program may be provided by communication means. In this case, for example, the above-described program may be regarded as an invention of "a computer readable recording medium in which the program has been recorded".

"The computer readable recording medium in which the program has been recorded" refers to a recording medium in which the program has been recorded and which is readable by a computer. This recording medium is used for installing, executing the program, and for distributing the program, for example.

Examples of the recording medium include "DVD-R, DVD-RW, and DVD-RAM" which are digital versatile disks (DVDs) and have a standard defined in the DVD forum; "DVD+R and DVD+RW" having a standard defined for DVD+RW; CD-ROM which is a compact disc and is a read only memory, a CD recordable (CD-R), a CD rewritable (CD-RW); a Blu-ray (registered trademark) disc, a magneto-optical disk (MO), a flexible disk (FD), a magnetic tape, a hard disk, a read only memory (ROM), an electrically erasable and rewritable read only memory (EEPROM (registered trademark)), a flash memory, a random access memory (RAM), and a secure digital (SD) memory card.

All or some of the programs may be recorded in the recording medium and thus be preserved or distributed, for example. The program may be transmitted by communication, for example, by using a transmission medium of a wired network or a wireless communication network used in a local area network (LAN), a metropolitan area network (MAN), a wide area network (WAN), the Internet, an intranet, and an extranet. The programs may be transmitted on a carrier wave.

Further, the program may correspond to a portion or the entirety of another program. The programs may be recorded in a recording medium along with another program. The program may be divided and recorded in a plurality of recording media. The program may be recorded in any manner such as compression or encryption, so long as the program may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor, configured to:
      acquire information from a communication device; and
      switch an apparatus to perform processing on the information acquired from the communication device, between the information processing apparatus and another information processing apparatus, in accordance with a state of the information processing apparatus and a state of the communication device,
   wherein a number of communication devices from which the information processing apparatus acquires information is equal to or greater than a predetermined value is provided as the state of the communication device, whether or not a user is operating the information processing apparatus, and whether or not the information processing apparatus is in a process of performing a job is provided as the state of the information processing apparatus,
   in a case where the state of the information processing apparatus is not being operated by a user and not performing a job and the number of communication devices is less than the predetermined value, the processor performs processing on the information acquired from the communication device without transferring the information,
   in a case where the state of the information processing apparatus is not being operated by a user and not performing a job and the number of communication devices is equal to or greater than the predetermined value, the processor transfers some pieces of information acquired from the communication device to the another information processing apparatus,
   in a case where the state of the information processing apparatus is being operated by a user or performing a job and the number of communication devices is less than the predetermined value, the processor transfers all pieces of information acquired from the communication device to the another information processing apparatus, and
   in a case where the state of the information processing apparatus is being operated by a user or performing a job and the number of communication devices is equal to or greater the predetermined value, the processor transfers all pieces of information acquired from the communication device to the another information processing apparatus.

2. The information processing apparatus according to claim 1,
   wherein the processor acquires a state of the other information processing apparatus, and determines whether or not all the pieces of information are transferred to the other information processing apparatus, in accordance with the acquired state.

3. The information processing apparatus according to claim 1,
   wherein the processor acquires a state of the other information processing apparatus and determines whether or not some pieces of the information are transferred to the other information processing apparatus, in accordance with the acquired state.

4. A non-transitory computer readable medium storing an information processing program causing a computer to:
   acquire information from a communication device; and
   switch an apparatus to process the information acquired from the communication device between an own information processing apparatus and another information processing apparatus, in accordance with a state of the own information processing apparatus and a state of the communication device,
   wherein a number of communication device from which the information processing apparatus acquires information is equal to or greater than a predetermined value is provided as the state of the communication device, whether or not a user is operating the information processing apparatus, and whether or not the information processing apparatus is in a process of performing a job is provided as the state of the information processing apparatus,
   in a case where the state of the information processing apparatus is not being operated by a user and not performing a job and the number of communication devices is less than the predetermined value, the processor performs processing on the information acquired from the communication device without transferring the information,
   in a case where the state of the information processing apparatus is not being operated by a user and not performing a job and the number of communication devices is equal to or greater than the predetermined value, the processor transfers some pieces of information acquired from the communication device to the another information processing apparatus,
   in a case where the state of the information processing apparatus is being operated by a user or performing a job and the number of communication devices is less than the predetermined value, the processor transfers all pieces of information acquired from the communication device to the another information processing apparatus, and in a case where the state of the information processing apparatus is being operated by a user or performing a job and the number of communication devices is equal to or greater the predetermined value, the processor transfers all pieces of information acquired from the communication device to the another information processing apparatus.

5. An information processing system comprising:

a first information processing apparatus; and one or more second information processing apparatuses to be connected to the first information processing apparatus via a communication path, wherein the first information processing apparatus includes a processor, configured to:

acquire information from a communication device, and switch an apparatus to process the information acquired from the communication device between the first information processing apparatus and the second information processing apparatuses, in accordance with a state of the first information processing apparatus and a state of the communication device, wherein a number of communication devices from which the first information processing apparatus acquires information is equal to or greater than a predetermined value is provided as the state of the communication device, whether or not a user is operating the first information processing apparatus, and whether or not the first information processing apparatus is in a process of performing a job is provided as the state of the first information processing apparatus, in a case where the state of the first information processing apparatus is not being operated by a user and not performing a job and the number of communication devices is less than the predetermined value, the processor performs processing on the information acquired from the communication device without transferring the information, in a case where the state of the first information processing apparatus is not being operated by a user and not performing a job and the number of communication devices is equal to or greater than the predetermined value, the processor transfers some pieces of information acquired from the communication device to the second information processing apparatus, in a case where the state of the first information processing apparatus is being operated by a user or performing a job and the number of communication devices is less than the predetermined value, the processor transfers all pieces of information acquired from the communication device to the second information processing apparatus, and in a case where the state of the first information processing apparatus is being operated by a user or performing a job and the number of communication devices is equal to or greater the predetermined value, the processor transfers all pieces of information acquired from the communication device to the second information processing apparatus.

* * * * *